United States Patent [19]

Zelins

[11] 4,412,672

[45] Nov. 1, 1983

[54] FEEDER GUIDE

[75] Inventor: Ronald P. Zelins, Rockaway, N.J.

[73] Assignee: Western Electric Company, Incorporated, New York, N.Y.

[21] Appl. No.: 313,053

[22] Filed: Oct. 19, 1981

[51] Int. Cl.³ .......................................... B65M 59/00
[52] U.S. Cl. ............................................ 254/134.3 R
[58] Field of Search ................ 174/135, 156, 157; 24/221 A, 221 K; 254/134.3 R, 134.3 FT

[56] References Cited

U.S. PATENT DOCUMENTS

| 1,369,913 | 3/1921 | Brunhoff. | |
|---|---|---|---|
| 2,439,975 | 4/1948 | Jones | 24/221 A |
| 2,515,724 | 7/1950 | McCroskey | 254/134.3 R |
| 3,160,394 | 12/1964 | Hunter et al. | 254/134.3 R |
| 3,363,879 | 1/1968 | Irik | 254/134.3 FT |
| 3,715,459 | 2/1973 | Hoffman. | |
| 4,132,665 | 1/1979 | Nelson | 254/134.3 R |
| 4,134,574 | 1/1979 | Jean. | |
| 4,148,463 | 4/1979 | Schrum | 254/134.3 FT |

FOREIGN PATENT DOCUMENTS 342697 4/1978 Austria ...................... 254/134.3 FT Primary Examiner—Robert C. Watson
Attorney, Agent, or Firm—R. F. Kip, Jr.

[57] ABSTRACT

A feeder guide (10) comprises a pair of tube segments (11a, 11b) corresponding to the halves of a tube produced by its vertical bi-section through its axis. The segments are coupled through a hinge means (50) to be relatively movable between positions at which they are, respectively, spread apart and closed together to jointly form a tube assemblage having a central bore (13) with a front bellmouth (19), inward thereof, a throat (18) at which the bore has its minimum transverse dimension, and, rearward of the latter, a taper (25) divergent towards the rear of the bore and of greater transverse dimension throughout than such minimum dimension. The two segments are longitudinally stiffened by two pairs of web flanges (30a, 31a and 30b, 31b) respectively integral therewith and are releasably holdable in said closed position by fastening means (60). In practice, an end length of synthetic resinous pipe is inserted into the rear of the bore and forced into its rear taper to render the guide frictionally held on such end length. Products being pulled through the pipe are then guided by such guide into the opening of such end length in a manner reducing or avoiding snagging of such products on the front end of the pipe.

3 Claims, 7 Drawing Figures

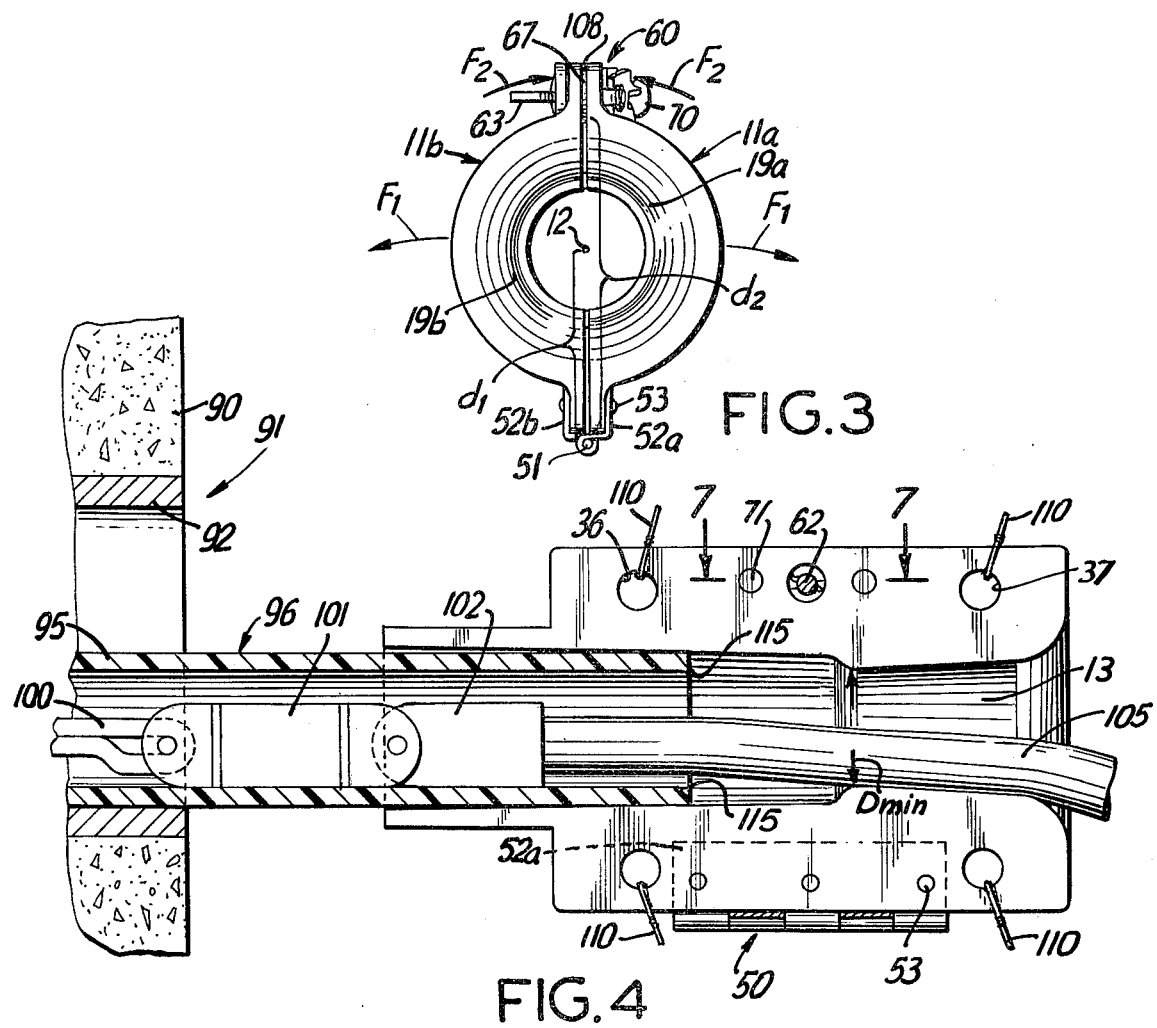
FIG.3
FIG.4
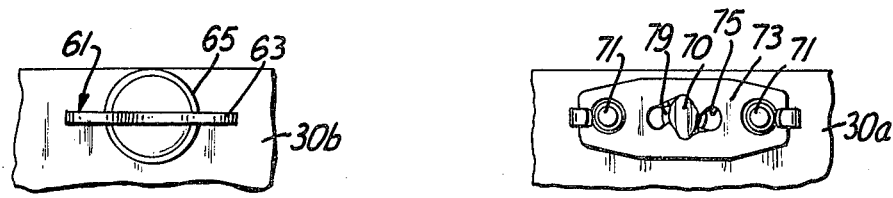
FIG.5
FIG.6
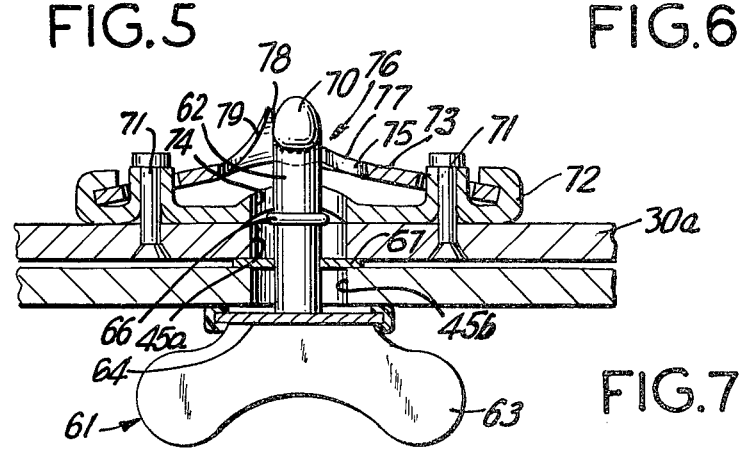
FIG.7

FEEDER GUIDE

TECHNICAL FIELD

This invention relates generally to tools for handling flexible elongated products in the course of their installation in ducts therefor such as underground ducts. More particularly, this invention relates to guides adapted to be positioned at the entry of such ducts for facilitating the feeding of such products and associated hardware into synthetic resinous piping containing in such ducts and for precluding or reducing damage in the course of such feeding. While the invention will be described in connection with its use in such feeding of optical fiber cable, the invention is not so limited but is also applicable in connection with such feeding of other kinds of products as, for example but without restriction, telecommunications wire cable, microwave coaxial cables, power cables, coated winchlines, etc., and associated hardware.

BACKGROUND OF THE INVENTION

In providing telecommunications via optical fiber cable between locations sufficiently remote to justify the cable's underground installation, the cable is oridinarily passed through underground ducts to which access is obtained by manholes. For purposes of protecting the cable from damage, such ducts usually contain one or more bodies of synthetic resinous piping (commonly known in the art as "inner duct") so placed in the ducts that, at the opening of a duct into a manhole, a length of the inner duct projects beyond that opening to terminate in a free end often formed by cutting the inner duct and having an annular front face with inner and outer peripheral edges. Such inner duct length is relatively stiff, and the mentioned edges of its front face are quite hard and sharp and may be somewhat jagged. Also, in the course of feeding an optical fiber cable or a preceding flexible elongated product into such length without the benefit of a guide, the front end of the cable or other product or hardware associated with either of them may snag against the front of the inner duct to be damaged or cause damage.

SUMMARY OF THE INVENTION

To avoid or reduce such damage, there is provided, according to the invention, a feeder guide comprising a pair of tube segments corresponding to the halves of a tube produced by its vertical bisection along its longitudinal axis. Those segments are pivotally connected to be spreadable apart, or alternatively, closed together to form an assemblage having the configuration of such tube. The guide includes fastening means for releasably holding the segments so closed.

The segments have formed therein similar channels each outwardly flaring to a front opening thereof, and each extending longitudinally through its segment from such front opening of the channel to a rear opening thereof. Each channel has a front section and a rear section extending towards each other from, respectively, such front and rear openings to respective inner section ends, the channel having its minimum transverse dimension at the inner end of its front section. The rear section of each channel has between its inner end and the rear channel opening a taper which is divergent towards such opening, and the transverse dimension of the rear section is greater over the length of that section than said minimum dimension.

In operation, the two tube segments are closed together to form the mentioned tube assemblage and are releasably held so closed. Such assemblage of segments held closed together constitutes the mentioned feeder guide as put into ready for use condition so as to have formed therein a longitudinally extending central bore.

The guide is fitted to the projecting length of inner duct by introducing the front end of such length into the rear opening of such bore. Then, the guide is forced over such length so as to cause the front portion of it to be driven into the taper in the bore of the guide to there wedgingly engage with the wall of the bore. The optical fiber cable or a preceding flexible elongated product or associated hardware is thereafter led into the front opening of the guide and passed through it and through the portion of inner duct in it to continue beyond. Because the cable or other product or hardware has to pass by the minimum transverse dimension of the bore before the cable encounters in the guide the portion of inner duct seated within the tapered part of the guie bore, and because the bore over the length of such portion has a greater transverse dimension than such minimum dimension, the cable or other product or hardware is guided within the bore by the bore wall to be positioned in relation to the inner edge of the front face of the inner duct in such manner that the cable or other product or associated hardware clears such edge without snagging on it.

DESCRIPTION OF STRUCTURE

For a better understanding of the invention, reference is made to the following description of a feeder guide for cable and other flexible elongated products which is an exemplary embodiment of the invention, and to the accompanying drawings in respect of which:

FIG. 3 is a right side elevational view of the FIG. 2 guide in its closed condition;

FIG. 4 is a vertical cross-sectional view of the FIG. 2 guide, taken as indicated by the arrows 4—4 in FIG. 2, and of its surrounds when the guide is in use;

FIG. 5 is a front elevation view taken as indicated by the arrows 5—5 in FIG. 2 of a portion of the FIG. 2 guide showing the front part of the fastener thereof;

FIG. 6 is a rear elevation view, taken as indicated by the arrows 6—6 in FIG. 2, of a portion of the FIG. 2 guide showing the rear part of the guide's fastener when it is in its hold position; and FIG. 7 is a fragmentary horizontal cross-sectional view, taken as indicated by the arrows 7—7 in FIG. 4, showing details of the mentioned fastener and its surrounds.

Figure 1:
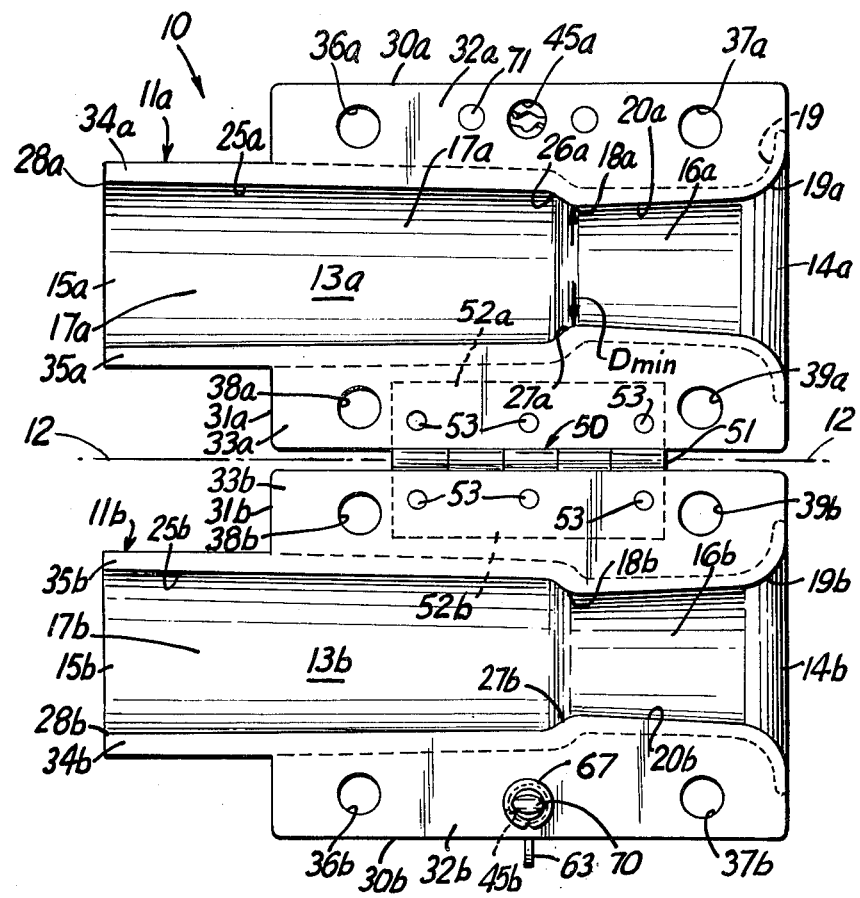
FIG. 1 is a plan view of such guide when in open condition.

In the description hereinafter, a description of any element identified by a reference numeral and associated alphabetical suffix is to be taken, unless the context otherwise requires, as applying equally to any other element identified by the same reference numeral but by a different alphabetical suffix following such numeral. Also, while the exemplary feeder guide is, for convenience described herein as having the spatial orientation shown by the figures, the invention of which such guide is a representative embodiment is not restricted to any particular spatial orientation of any embodiment thereof.

STRUCTURE OF EMBODIMENT

Referring now to FIG. 1, the reference numeral 10 designates a feeder guide including a pair of similar tube segments 11a, 11b corresponding, respectively, to the two halves of a tube produced by its vertical bisection along its longitudinal axis represented in FIG. 1 by line 12. Considering segment 11a as exemplary, it has formed therein an interior channel 13a extending longitudinally therethrough from a front opening 14a of such channel to a rear opening 15a thereof, the channel being, over its length in planes normal to its centerline, of circular cross section or other appropriate concave configuration. Channel 13a is divided into front and rear sections 16a and 17a extending, respectively, from openings 14a and 15a towards each other to respective inner section ends meeting at location 18a at which the channel has a throat at which such channel has its minimum transverse diameter $D_{min}$, $D_{min}$ preferably being equal to or slightly less than the minimum dimension within tolerance of the inner diameter of the mentioned inner duct.

Channel section 16a includes, at its front, a bellmouth 19a by virtue of which the channel flares outwardly towards its front opening 14a. Behind mouth 19a there is a length 20a of channel section 16a which extends to throat location 18a, and which is shown as having a slight frusto-conical taper convergent to the channel's minimum transverse $D_{min}$ but which, alternatively, may be cylindrical or have some other configuration.

Rear channel section 17a, over its length from throat location 18a to rear opening 15a, has at all points a transverse channel dimension greater than the minimum transverse channel dimension $D_{min}$. Between such location and opening the channel has a taper 25a diverging towards such opening and shown as being frusto-conical although it may have some other configuration. The inner end 26a of such taper can begin at throat location 18a, and have at such beginning a transverse dimension greater than $D_{min}$. In such case, the respective inward ends of front sections 14a and 15a would be separated by a flat annular shoulder formed within channel 13a and extending therein transversely but not axially. In preference to such wholly transverse flat shoulder however, and for easier manufacture and avoidance of strain concentrations, there is provided in rear section 15a between location 18a and the beginning 26a of taper 25a an axially and transversely extending annular slanting shoulder 27a which is internally formed in the boundary wall surface of channel 13a, and which is faired or rounded at its junctions with front section 14a and the rear section taper 25a to provide a smooth transition between the transverse dimension $D_{min}$ at the inward end of such front section and the greater transverse dimension of the taper at its beginning 26a. The difference, between such two transverse dimensions is preferably about the same as (although it may be somewhat more or less than) the thickness between the inner and outer surfaces of the length of inner duct to be inserted, as later described, into the guide 10.

The divergent taper 25a is adapted to receive within it, and be wedgingly engaged by, the mentioned length of inner duct whose outer diameter may vary within acceptable tolerances. To assure that such wedging engagement will be obtained despite such variation, the taper 25a at its inner end has a transverse dimension slightly smaller than the minimum acceptable outer diameter of such inner duct, and, at its outer end 28a, has a transverse dimension slightly greater than the maximum acceptable outer diameter of such inner duct the difference between such two end dimensions of the taper being preferably less than the difference between the inner and outer transverse dimensions of shoulder 27a. The axial length of taper 25a is preferably greater than $D_{min}$ and may be several times $D_{min}$. To provide for good friction between the inner wall surface of taper 25a and the length of inner duct in contact therewith, such wall surface is preferably an unmachined or otherwise rough surface. As shown in FIG. 1, the taper's outer end 28a coincides in axial position with the rear opening 15a of the channel 13a. If desired, however, the channel may extend rearwardly somewhat of that taper end and, over such rearward extension, be, for example cylindrical, tapered or otherwise configured.

The channel 13b in segment 11b is similar in all respects described above to the channel 13a in segment 11a.

The tube segment 11a is complemented by top and bottom longitudinal stiffening web flanges 30a and 31a. Each of these flanges is integral with the segment, is generally rectangular in shape, extends longitudinally from the front of the segment to a point intermediate the opposite ends of the rear channel section 17a, and extends transversely outward from the segment. More specifically as to their transverse extension, the flanges 30a and 31a project transversely outwards from, respectively, the top and bottom of segment 11a and have respective planar inner faces 32a, 33a which lie in the diametral plane of the channel as do the planar edges 34a, 35a of the segment which border the channel 13a. Flanges 30a and 31a are identical and axially symetrical about the longitudinal centerline of channel 13a. In this way identical tube segments and associated flanges may be used for both sides of guide 10 to thereby realize economy of manufacture.

Top flange 30a has formed therein a pair of circular holes 36a and 37a respectively disposed near the two outward corners of the flange, such holes being used to tie positioning lines to the guide 10. A pair of similar holes 38a, 39a is formed for the same purpose in bottom flange 31a. Top flange 30a has in addition formed therein a longitudinally central hole 45a spaced transversely outward of the segment 11a and is shown as disposed in the axial direction slightly to the rear of location 18a at which channel 13a has its minimum transverse dimension $D_{min}$, although hole 45a may desirably be disposed forward of its shown site. Hole 45a is used in connection with the releasable holding together of segments 11a, 11b as will be later described.

The tube segment 11b is complemented by top and bottom flanges 30b and 31b similar in all the respects so far described to, respectively, the flanges 30a and 31a of the segment 11a.

Figure 2:
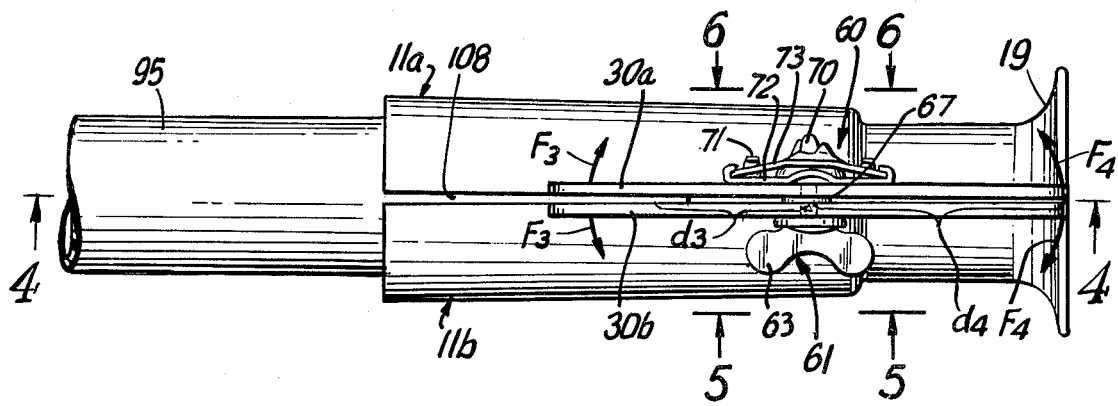
FIG. 2 is a plan view of such guide when in closed condition.

Tube segments 11a and 11b are pivotally connected together to be relatively movable between relative positions at which they are spread apart (as in FIG. 1) and are closed together (as in FIG. 2). Such connecting of those segments is effected by coupling means comprising bottom flanges 31a, 31b and a hinge means 50. The hinge means consists of a hinge pin 51 disposed between the outer edges of the flanges in parallel relation to axis 12 and, also, a pair of hinge plates 52a, 52b secured by rivets 53 to, respectively, flanges 31a and 31b, those hinge plates on their outer sides being pivotally joined together by pin 51.

When the tube segments are closed together they register to jointly form an assemblage having the configuration of the mentioned tube. To the end of releasably holding such segments in such closed position, there is provided a fastening means which may take a variety of forms but may conveniently be a wing head quick connect fastener 60 of the kind shown in the FIGURES. Referring particularly to FIGS. 5, 6 and 7, fastener 60 includes a key 61 having a pin 62 adapted to pass loosely through the holes 45b, 45a in respectively, the flanges 30b, 30a, a wing head 63 on the outside of flange 30b, and a disc 64 between the wing head and the pin, elements 62-64 being coaxial and integral with each other. Disc 64 is of greater diameter than hole 45b and has thereon a plastic rim 65. Pin 62 has thereon about midway along its length an annular bead 66 of smaller diameter than holes 45b, 45a and adapted to hold on the pin a thin split washer 67 of larger diameter than such holes and disposed on the inner side of flange 30b. By this arrangement, the key 61 (which includes elements 62-67) remains loosely secured to flange 30b when such flange is separated from flange 30a.

Pin 62 has at its front end a pair of oppositely-disposed nibs 70 projecting laterally outward from the shank of the pin and adapted to pass through hole 45a in flange 30a and to be in vertical alignment with each other when the wing head 62 is horizontally aligned. For purposes of cooperating with such nibs, there is provided as part of fastener 60 a key securing means in the form of an inner metal strap 72 attached to the outer surface of flange 30a by rivets 71 and an outer resilient metal strap 73 loosely secured to strap 72 by having the ends of the latter bent up and over. The straps 72 and 73 are further bent to have their central portions raised from hole 45a. Inner strap 72 has formed in its central portion an aperture 74 large enough to permit passage therethrough of nibs 70. Outer strap 73 has formed in its central portion an aperture 75 which permits and blocks passages therethrough of such nibs when they are aligned horizontally and vertically, respectively. Strap 73 is configured in the vicinity of aperture 75 such that, after nibs 70 have passed through such aperture and then been rotated through ninety degrees by clockwise rotation of wing head 63, the two nibs contact, respectively, two specially formed nib engaging regions 76 provided by strap 73 and bordering aperture 75 on vertically opposite sides thereof. Each such region is so shaped that, in the course of such rotation of the contacting nib, it progressively encounters, first, a gradually inclined cam surface 77 urging the nib outward as the nib moves over it, then a shallow indentation 78 in which the nib seats at the end of its rotation, the indentation acting as a detent therefore, and, finally, if the rotation is attempted to be carried beyond ninety degrees, an outwardly bent prong 79, such prong serving as a stop to prevent such further rotation.

When the tube segments 11a and 11b are spread apart, key 61 is, as stated, loosely secured to flange 30b on the segment 11b. Assuming it is desired to clamp those segments in closed position, as they are brought together, the key is manipulated to insert the end of pin 62 into and through the hole 45a in flange 30a on segment 11a. At or about this time, the wing head 63 is adjusted in position until the nibs 70 will pass through aperture 74 of inner strap 72, the wing head then being vertical. With the nibs thus being prealigned for passage not only through aperture 74 but through aperture 75 of outer strap 73 as well, the key is urged forward to pass the nibs 70 through both such apertures and to bring the plastic rim 65 on the key to bear against the outer face of flange 30b. Wing head 62 is then rotated clockwise through ninety degrees to horizontal position. During such rotation, the nibs 70 are wedgingly urged outward by the cam surfaces 77 on strap 73 to thereby draw the flanges 30a and 30b together, under resilient force produced by the resilient deformation of strap 73, until the flanges almost come into contact at the location of the fastening means, their abutting each other at such location being prevented only by the thin key-retaining washer 67 disposed between them. At the end of such rotation, nibs 70 become seated in detents 78 to prevent casual backward rotation of the key and consequent inadvertent releasing of the flanges.

The flanges 30a, 30b are thus held together until it is desired to release them. At that time, wing head 63 is turned counterclockwise ninety degrees from its horizontal position to its vertical position to release nibs 70 from engagement with strap 73 and permit withdrawal of pin 62 through apertures 75, 74 and hole 45a. The flanges 30a, 30b may then be moved away from each other.

The fastener 60 is commercially available from Southco Inc., 237 Brinton Lake Rd. Concordville, Pa.

OPERATION AND USE

FIG. 1 shows the described feeder guide in use. In that FIGURE, reference numberal 90 designates a sidewall of a manhole generally indicated by the numeral 91. Passing through such wall to open into manhole 91 is a permanent underground duct 92 extending from manhole 91 to a remote manhole or other remote termination (not shown).

Duct 92 is shown as containing an inner duct 95 which may be installed therein in the manner described in the article entitled "Installation of Lightguide Cable" by Daniel L. Pope and Norman E. Flenniken in the Winter 1980 issue of *THE WESTERN ELECTRIC ENGINEER* so as to leave a length 96 of the inner duct projecting from duct 92 into the manhole. Inner duct 95 is wholly constructed of a synthetic resinous material which is somewhat resilient but is relatively stiff. While length 96 is, as shown, relatively short, it may be substantially longer for the purpose, say, of extending to, or almost to, another length of inner duct projecting into the manhole from a duct opening into the manhole from a sidewall other than wall 90.

Inner duct 95 is depicted in FIG. 4 as just having had fed thereinto a combination consisting, from left to right in the FIGURE, of a loop 100 of polyethylene coated wire rope (known in the art as "coated winchline") formed at the back end of a length of such rope which has already been pulled through inner duct 95, a swivel 101 having its front end coupled to loop 100 and its back end coupled to a pulling eye 102, and a length of optical fiber cable 105 attached at its front to the eye 102 to be drawn through inner duct 95 by the pulling therethrough of the coated winchline. The winchline has in turn been previously drawn through the inner duct by a light synthetic resinous line (not shown) known in the art as "fishline."

Prior to the drawing of the winchline through the inner duct by the fishing, the feeder guide 10 is affixed to the projecting length 96 of the inner duct in a manner as follows. Starting with the guide being separated from the inner duct and the guide's tube segments being spread apart, these segments are brought together to closed position (FIGS. 2 and 3), and the fastener 60 is then manipulated as hereinbefore described to lock such segments in closed position. At this point such segments cooperate to form a tube assemblage 11 having a central bore 13.

With the guide 10 being so closed, it is fitted onto inner duct 95 by inserting the front end of the inner duct into the rear opening of the guide, and by then forcing by hand the guide over the inner duct until the latter is driven into the rear taper of the guide's bore insofar as can be effected by that hand forcing. By so doing, a front portion of the inner duct wedgingly engages the wall of the bore over a length of such taper, that portion thereby being resiliently compressed to produce between such portion and such length a frictional contact holding the guide firmly enough to the inner duct to prevent any casual dislodgement of the guide. To produce such frictional hold by a wedging engagement between the inner duct and a tapered part of the bore of the guide is advantageous because it renders the firmness of the frictional grip which can be attained substantially independent of variation in the diameter of the bore caused by wear or deviation in manufacture from the nominal diameter of such bore, and substantially independent also, of variation within acceptable tolerances of the outer diameter of the inner duct and of any lack of concentricity thereof. Behind the point at which the inner duct first makes wedging engagement with the wall of the bore's rear taper, the wall of the taper supports the inner duct against any tendency of it to buckle as it is driven into the bore.

When the inner duct wedgingly engages the interior of the rear of the guide as described, the inner duct exerts on the guide segments 11a, 11b opposite outwardly—directed transverse force components $F_1$ (FIG. 3) which can be considered as being vertically at the axis 12 of the guide's bore, and which, defining $d_1$ as the distance between that axis and hinge pin 51, produce about such pin a pair of moments $F_1d_1$ acting in the transverse-vertical plane and urging tube segments 11a, 11b apart. These moments are, however, counteracted by opposing moments $F_2d_2$ produced by the fastener 60, $d_2$ being its distance from the pin 51. Since $d_2$ is greater than $d_1$ for the reason among others that fastener 60 is disposed on the top longitudinal flanges so as to be transversely outward of the tube segments, the holding force components $F_2$ needed to be exerted by the fastener in order to neutralize the moments $F_1d_1$ can be less in value than the force components $F_1$.

To the extent there is any play in the coupling of hinge pin 51 with hinge plates 52a, 52b and in the coupling of the fastener 60 with the flanges 30a, 30b, the mentioned wedging engagement produces further active moments $F_3d_3$ (FIG. 2) in the transverse-horizontal plane about fastener 60 as a pivot point $F_3$ being the force components involved in such moment, and $d_3$ being the length of the "arms" of such moments.

Those moments also tend to spread apart the rear positions of the tube assemblage. Inasmuch as, however, fastener 60 is forward of the point at which, on the average, force components $F_3$ can be considered to act (namely, the longitudinal center point of the rear taper 25 formed in the bore of the guide), the effect of these active moments $F_3d_3$ is to tend to produce about fastener 60 a pivoting of the tube segments bringing their front ends together in a forcible engagement yielding counteracting moments $F_4d_4$ in which $F_4$ represents the reactive forces exerted by such front ends on each other, and $d_4$ represents the distance from the front end of the guide to the fastener 60. Evidently the forces $F_3$ will operate to tend to maintain the tube segments 11a, 11b forcibly closed together at their front ends so as to prevent by positive force the opening up of any gaps between the segments within the bellmouth 19 of the guide. The avoidance of such gaps within that mouth is desirable in order to preclude a snagging in such gaps of whatever is being drawn through the guide.

At the rear of the guide, the radially outward forces exerted by the resiliently compressed inner duct 95 on the wall of the guide's bore will tend to open up gaps 108 between the tube segments. The size of these gap is, however, kept small by virtue of the fact that the segments are locked together at fastener 60 and are constrained from substantial spreading apart rearward of the fastener by the inherent longitudinal stiffness of the tube segments and the additional longitudinal stiffening provided by the web flanges 30a, 30b, 31a, 31b and by the long hinge pin 51.

The gaps 108 at the rear of the guide not only do no harm but likely contribute to the effectiveness of the frictional holding of the guide on the inner duct. More specifically, if both the inner duct and the effective cross section of the tapered part of the bore into which the inner duct is driven were to be exactly circular in cross section, then, in order for the wedging engagement of the inner duct and the wall of the bore taper to produce a resilient frictional holding of the guide on the inner duct, it would be necessary for the wedging action to force the outer surface of the inner duct radially inward at all parts around its circumference. Since, however, the inner duct is very resistant to such a reduction in its cross-sectional size without any deformation in its shape, the inner duct could be driven by the available hand force into the bore taper, beyond the point of pressureless contact between the inner duct and bore wall, only by an amount which would be so small as to possibly result in an unreliable frictional holding of the guide on the inner duct. On the other hand, with the gaps 108 being present, the effective cross section of the bore taper is changed from circular to slightly elliptical or otherwise non-circular to thereby permit the wedging engagement of the bore taper and inner duct to resiliently compress the latter so as to undergo a deformation in shape from more to less circular. The inner duct, however, is much more compliant to such shape deformation thereof than to the aforementioned reduction in its cross-sectional size. Accordingly, when there is such a non-matching between the cross-sectional shape of the inner duct and the effective cross-sectional shape of the rear tapered part of the guide's bore, there is no difficulty in driving with the available hand force the inner duct into the bore taper, beyond the point of pressureless contact therebetween, to an extent which results in a good frictional holding of the guide on the inner duct.

Applicant believes that the foregoing provides a reasonable explanation of why (taking into account, also, the roughened surface of the bore wall within the bore taper) the described feeder is enable to obtain a firm frictional grip on the inner duct, but applicant should not be considered as bound by such explanation.

To summarize, when the closed guide 10 is fitted as described onto the inner duct 95, the guide is rendered in a condition such that there is a firm frictional gripping of the inner duct by the guide and, further, a tendency to close under positive force, in the bellmouth 19 of the guide, any gaps between the tube segments 11a and 11b.

The guide as so fitted on the inner duct is spatially oriented within manhole 91 by the use of positioning lines 110 tied to the holes 36, 37, 38 and 39 of the guide. Then the various elements which pass through the inner duct are pulled in succession through the guide and through the inner duct, those elements being, in order of pulling, the fishline, the coated winchline terminating at its back end in loop 100, the swivel 101, the pulling eye 102 and the optical fiber cable 105. Such elements are prevented from snagging with the guide because they are led in a faired manner into it by its bellmouth 19. Further, such elements while passing through the guide and the portion of inner duct 95 contained in the guide are prevented from snagging on the inner edge 115 of the front face of the inner duct in that, because those elements must first pass by the minimum transverse dimension $D_{min}$ at the throat of the guide's bore, and the inner duct is seated in the rear section of the guide which over its length has a transverse diversion greater than $D_{min}$ (so as, in effect, to partly or fully recess inner edge 115 of the inner duct in relation to $D_{min}$), the passing of each element past $D_{min}$ positions that element such that the element will later pass by that edge without snagging it. Also, the various elements which pass through the guide will not snag on any open gaps between its two side members because at the front of the guide, these gaps tend to be closed as heretofore described by the wedging effect of the portion of inner duct contained in the guide and, at the rear of the guide where there may be open gaps 108 of small size between the guide's two side members, the inner duct is interposed between those gaps and the element so as to prevent any such snagging.

The described feeder guide accordingly provides a smooth transition into the inner duct when pulling in fishline, winchline or optical fiber cable. In such connection, both the pulling eye and the sheath termination hardware on the optical fiber cable have abrupt profile changes, or shoulders, and should one of those shoulders encounter a cut end of the inner duct, a tension spike of unknown magnitude and duration could occur. While such inadvertent interferences often free themselves, sometimes they do not, and, when they do not, the pull has to be interrupted and the interference cleared or even, possibly, the rigging of the inner duct has to be completely redone. Use of the described feeder guide in all manholes where the inner duct is interrupted by being cut will prevent such interferences during the pull and will avoid the possibility of damage from such interferences to the cable, the cable hardware, the inner duct, the winchline or the winch.

After the optical fiber cable has been pulled through the guide 10 and inner duct 95 so as to be installed in the latter, the guide 10 can be removed from around the cable and inner duct by simply manipulating the guide's fastener 60 to release the two sides of the guide from each other and allow them to spread apart until the guide can be laterally slipped away from the cable and inner duct. The guide 10 is thus reusable for installation purposes over and over again which, of course, is a great cost advantage.

DETAILS OF CONSTRUCTION

Each of the guide's two side members consisting of the tube segment and the two flanges integral therewith may be made of cast aluminum and, as stated, these two side members may be identical so that the same casting mold may be used to produce both. The hinge of the guide may be of aluminum and be riveted to the guide's side members by aluminum rivets. The parts of the guide's fastener 60 may be of steel. The guide has an overall length of approximately six inches and, using that dimension as a reference, its other dimensions are, in general, shown to scale by the FIGURES hereof. The FIG. 1 guide is adapted to be used with inner duct in the form of polyethylene plastic pipe constructed per the ASTM specification identified as ASTM-D-2239-74, SDR 7, such pipe having an average inside diameter of 1.049" with an acceptable variation within tolerance limits of +0.010" and −0.020", the minimum acceptable value for the outer diameter of the pipe being 1.329", and the maximum acceptable value for the outer diameter of such pipe being 1.399". Related significant dimensions for the guide are a $D_{min}$ of 1.020±0.10" at location 18a, a transverse dimension of 1.320±0.10" at location 26a for the inner end of the rear taper 25a formed in the bore of the guide, and a transverse dimension of 1.440±0.10" at location 28a for the outer end of such rear taper.

The above-described embodiment being exemplary only, it will be appreciated that additions thereto, omissions therefrom and modifications thereof may be made without departing from the spirit of the invention. For example, the guide may be in the form of a one-piece tube with a bore which either does or does not include an internal shoulder similar to that described above, and which otherwise has the same features as the FIG. 1 guide, but one such piece guide is not a preferred embodiment for the reason among others that it is not reusable.

Accordingly, the invention is not to be considered as limited since as is, is consonant with the scope of the following claims.

What is claimed is:

1. A feeder guide adapted for use with products being introduced into the opening of an end length of synthetic resinous pipe, said guide comprising:
   (a) a pair of tube segments corresponding to the halves of a tube produced by its vertical bisection along its longitudinal axis;
   (b) said segments having similar interior channels each flaring outwardly to a front opening thereof, and each extending longitudinally through its segment from such front opening of such channel to a rear opening thereof;
      (i) each such channel comprising front and rear sections extending from respectively, said front and rear openings of such channel towards each other to respective inward-section ends;
      (ii) each such channel having a minimum transverse dimension at the inward end of its front channel section;
      (iii) each such rear channel section having formed between its inward end and its rear opening a taper divergent towards such opening, the transverse dimension of such section being greater than said minimum dimension over the length of such section;

(iv) each such channel having formed at the inward end of the rear section thereof an internal shoulder extending transversely in such channel to provide a transition between said minimum transverse dimension thereof and said taper, said shoulder having a greater inclination to the axis of said channel than does said taper;

(v) said shoulder in each such channel and said divergent taper thereof being relatively proportioned such that the transverse dimension of such shoulder between that shoulder's transversely inner and outer extremities is greater than the difference between the transverse dimensions of such taper at, respectively, that taper's longitudinally inner and outer extremities;

(vi) the longitudinal extent in each such channel of the divergent taper thereof being several times greater than said minimum transverse dimension of such channel;

(c) coupling means pivotally connecting said segments so as to render said segments relatively movable between an open position at which they are spread apart and a closed position at which they register to jointly form an assemblage having the configuration of said tube and having formed therein a central bore with an internal annular shoulder and a rearward taper provided by, respectively, the shoulders and the said tapers of said channels; and (d) fastening means for releasably holding said segments in said closed position; said guide when in the form of said assemblage being adapted to have said end length of said pipe inserted into the rear opening of said bore and forcibly driven into said bore taper so as to make with the wall of said bore a wedging engagement by which such guide is frictionally held on such end length of such pipe.

2. A feeder guide according to claim 1 having two longitudinal web flange means each integral with a respective one of said two segments and projecting transversely outwards therefrom so as to register with each other when said segments are in said closed position, each such web flange means consisting of two longitudinal web flanges disposed on opposite transverse sides of the segment integral therewith, said two flanges being identical in configuration and being axially symmetrical in relation to the longitudinal centerline of such segment, and said two flanges having respective transversely outer flange edges which are substantially parallel to such centerline and longitudinally extend over both the first and rear sections of such segment, said flanges being of sufficient transverse width to increase significantly the longitudinal stiffness of that segment between such sections.

3. A feeder guide according to claim 1 in which said fastening means is a localized fastening means longitudinally disposed rearward of said front sections of said channels to be within the longitudinal extent of said tapers thereof and longitudinally adjacent to said shoulders thereof.

* * * * *